United States Patent [19]

Reimers et al.

[11] 4,312,233
[45] Jan. 26, 1982

[54] FLOW RATE METER CORRECTION APPARATUS

[75] Inventors: Stephen D. Reimers, 6269 Leesburg Pike, Falls Church, Va. 22044; Larry L. Wischhoefer, Washington, D.C.

[73] Assignee: Stephen D. Reimers, Falls Church, Va.

[21] Appl. No.: 117,209

[22] Filed: Jan. 31, 1980

[51] Int. Cl.³ .............................................. G01F 15/02
[52] U.S. Cl. ................................. 73/861.01; 73/272 R
[58] Field of Search ........... 73/861.01, 861.02, 861.55, 73/861.56, 272, 432 A, 3; 116/281, 283; 128/205.23

[56] References Cited

U.S. PATENT DOCUMENTS 2,142,741  1/1939  Zacharia ............................ 73/861.01
2,859,618  11/1958  Gorrie ................................ 73/861.01
3,073,157  1/1963  Gehre ................................. 73/861.01

Primary Examiner—Herbert Goldstein
Attorney, Agent, or Firm—Finnegan, Henderson, Farabow, Garrett & Dunner

[57] ABSTRACT

A flow rate meter correction device for fluid supply systems, wherein actual meter conditions and/or end use point conditions vary substantially from meter calibration conditions, having a variable length scale for indicating actual (corrected) flow in appropriate units means for calculating a correction factor reflecting the deviation of actual meter indication (pointer movement, etc) from meter indication under meter calibration conditions, and means responsive to the correction factor for interrelating the meter indicator with the variable length scale. The variable length scale indication is positionable relative to the meter indication by positioning means associated with the calculating means.

9 Claims, 6 Drawing Figures

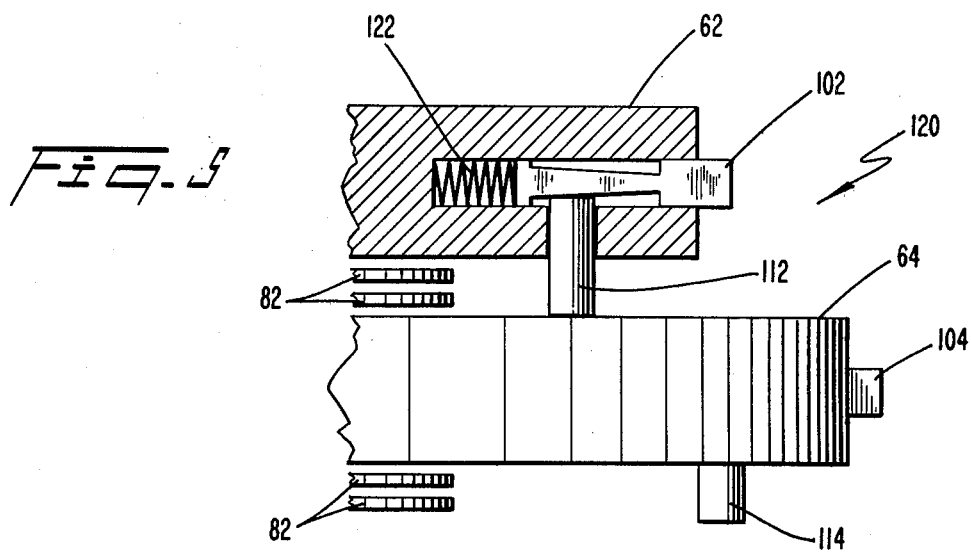
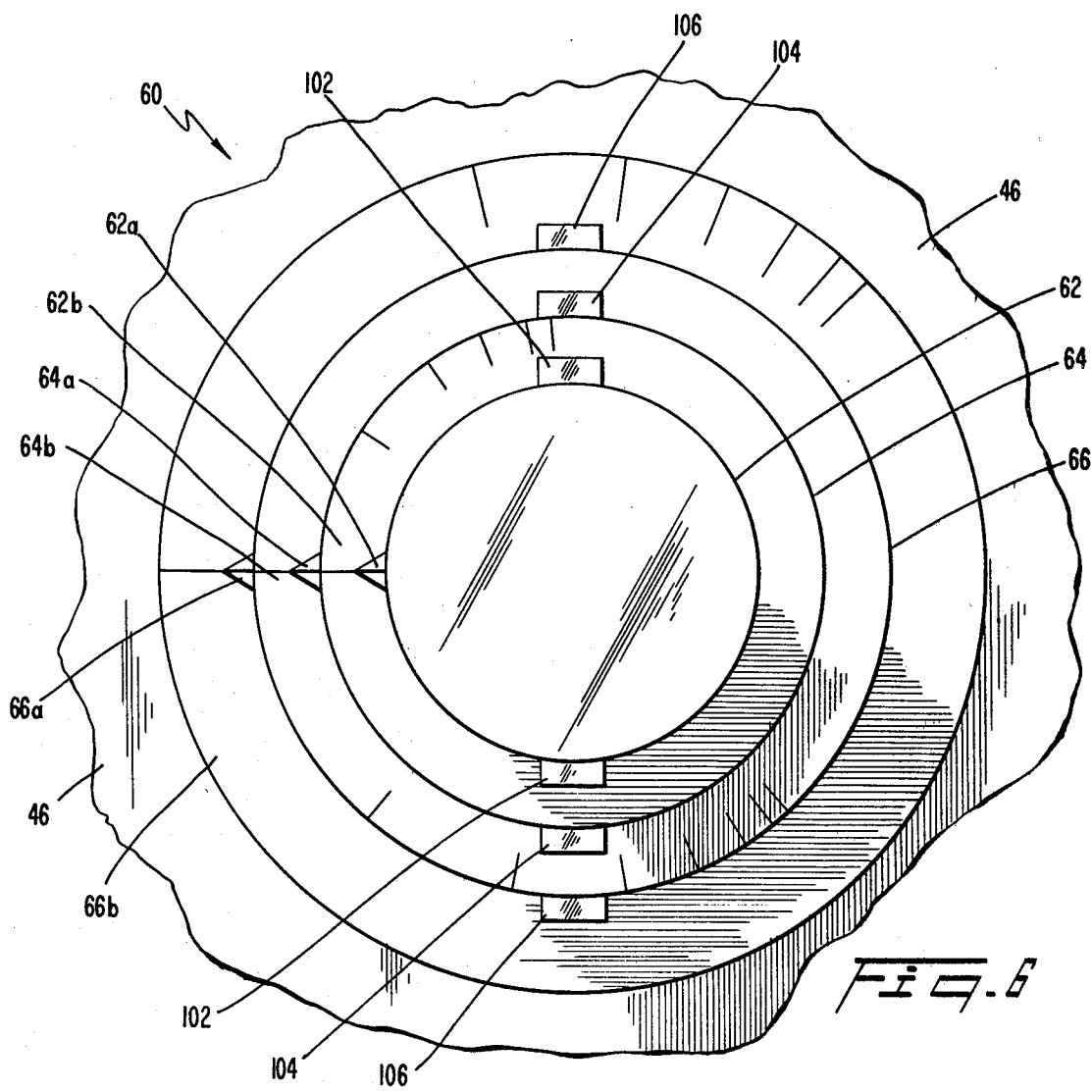

FLOW RATE METER CORRECTION APPARATUS

BACKGROUND OF THE INVENTION

1. Field of the Invention

This invention is directed to apparatus for correcting the indicated flow rate on meters used on fluid (principally gas) supply systems having measurement and/or delivery conditions varying substantially from meter calibration conditions.

2. Description of Prior Art

Insuring delivery of a desired flow rate of a fluid or fluid mixture is an important requirement of many fluid delivery systems. Generally, such systems will have an in-line meter to provide an indication of the flow rate of the fluid in appropriate units (volume per unit time, weight per unit time, etc.) and an operator will increase or decrease the rate of flow from the fluid source in order to achieve correspondence between the flow rate indicated on the fluid meter and a desired flow rate. Flow rate meters are calibrated to indicate flow rates for specific or "standard" conditions (eg. specific gravity, viscosity pressure, temperature, etc.) of the fluid medium. These fluid conditions are hereafter referred to as the "meter calibration" conditions. Variation of any of these fluid parameters under actual measurement conditions can introduce an error factor into the meter indication which may be of significance. Additionally, the conditions at the delivery point may be different from both the measurement conditions and the meter calibration conditions. The compressible nature of gases relative to liquids increases the magnitude of these errors relative to liquid supply systems, and it thus may be of crucial importance to correct these errors to as great an extent as possible.

Previous attempts to account for varying fluid conditions have usually concentrated on supplying correction devices to account for relatively small changes in the temperature and pressure of gases at the meter location. U.S. Pat. No. 1,585,859 to Huff shows a device for adjusting a meter scale to account for changes in barometric pressure and atmospheric temperature in a system used for feeding air to a compressor. While devices such as shown in Huff are adequate for applications wherein measurement conditions change only slightly from meter calibration conditions, they are inadequate to serve as correction devices in fluid supply systems wherein substantial changes in measurement and/or delivery conditions can occur.

One such application in which the fluid parameters may vary significantly from meter calibration conditions is related to supplying breathing gas from some source usually located above the water surface to a diver working underwater. In such underwater diving applications, the pressure at which the gas must be delivered increases dramatically with depth, with the pressure increasing by about 1 atmosphere for every 33 feet increase in water depth. In general, a diver uses about 2-5 cfm (cubic feet per minute) of gas at his ambient conditions. For a diver working at about 100 feet, and due to the compressibility of the gas, a mass of gas four times the amount at STP (standard temperature and pressure) conditions is required to be delivered to the diver containment in any given period of time. Since usual diving apparatus for supplying breathing gas from the surface includes a flow throttling device between the meter and the diver containment, it can be expected that gas conditions (pressure, etc.) in the diver containment could vary appreciably from the gas conditions existing at the point where the gas passes through the meter.

The present invention advantageously provides a correction device that can compensate for substantial parameteric changes at the point of measurement and/or at the point of delivery in a fluid supply system and still provide an adequate indication of the flow rate delivered. The correction device of the present invention can also handle a plurality of parameters influencing the indication on the fluid flow meter. And finally, the present invention provides an apparatus which may be purely mechanical for correcting flow rate meters, which apparatus can be fabricated economically and can function reliably in a highly moist and corrosive environment.

Additional advantages of the invention will be set forth in part and description which follows, and in part will be obvious from the description, or may be learned by practice of the invention. The advantages of the invention may be realized and obtained by means and in combination particularly pointed out in the appended claims.

SUMMARY OF THE INVENTION

In accordance with the invention, as embodied and broadly described herein, an apparatus for correcting the indication on a flow rate meter used in a fluid supply system having measurement and/or delivery conditions varying substantially from meter calibration conditions, the flow rate meter having an indicator, the indicator deflection from a zero flow rate reference mark being uniquely related to the flow rate (at given conditions) through the meter, comprises an adjustable scale means for indicating the actual flow rate under varying fluid conditions; mechanical means for calculating a correction factor relating the meter indicator deflection at actual measurement and delivery conditions to the meter indicator deflection under meter calibration conditions, the calculating means being responsive to inputted values of a plurality of flow rate indication influencing parameters representative of the fluid metering conditions and the fluid delivery conditions; and means responsive to the correction factor for positioning the adjustable scale means, the corrected actual flow rate being indicated on the adjustable scale means by the meter indicator.

Preferably, the adjustable scale means includes variable length scale means and positioning means cooperating with the variable length scale means for converting the calculated correction factor into an appropriate scaling movement of the variable length scale means, the indicator means registering on the variable length scale means at the correct flow rate value.

It is also preferred that the calculating means includes means, such as dial means or linear slide means, for inputting values of the variable parameters of interest, the inputting means producing mechanical signals proportionally to the logarithms of the respective parameter values; and means for combining the individual ones of the mechanical signals generated by the input means to produce a first net mechanical signal proportional to the logarithm of the correction factor.

It is also preferred that the calculating means includes an output shaft wherein the angular displacement of the output shaft is proportional to the logarithm of the calculated correction factor, and that the positioning means includes a cam means attached to the output shaft for controlling the variable length scale means, the cam means having an exponential camming surface for producing a variable length scale means displacement corresponding to the antilog of the logarithm of the correction factor.

The accompanying drawing, which is incorporated in, and constitutes a part of, the specification, illustrates one embodiment of the invention and, together with the description, serves to explain the principle of this invention.

BRIEF DESCRIPTION OF THE DRAWING

FIG. 5 is a detailed schematic showing the principle of operation of a portion of the embodiment of the invention shown in FIG. 4.

FIG. 6 is a front view of the portion of the apparatus shown in FIG. 4.

DESCRIPTION OF THE PREFERRED EMBODIMENT

Figure 1:
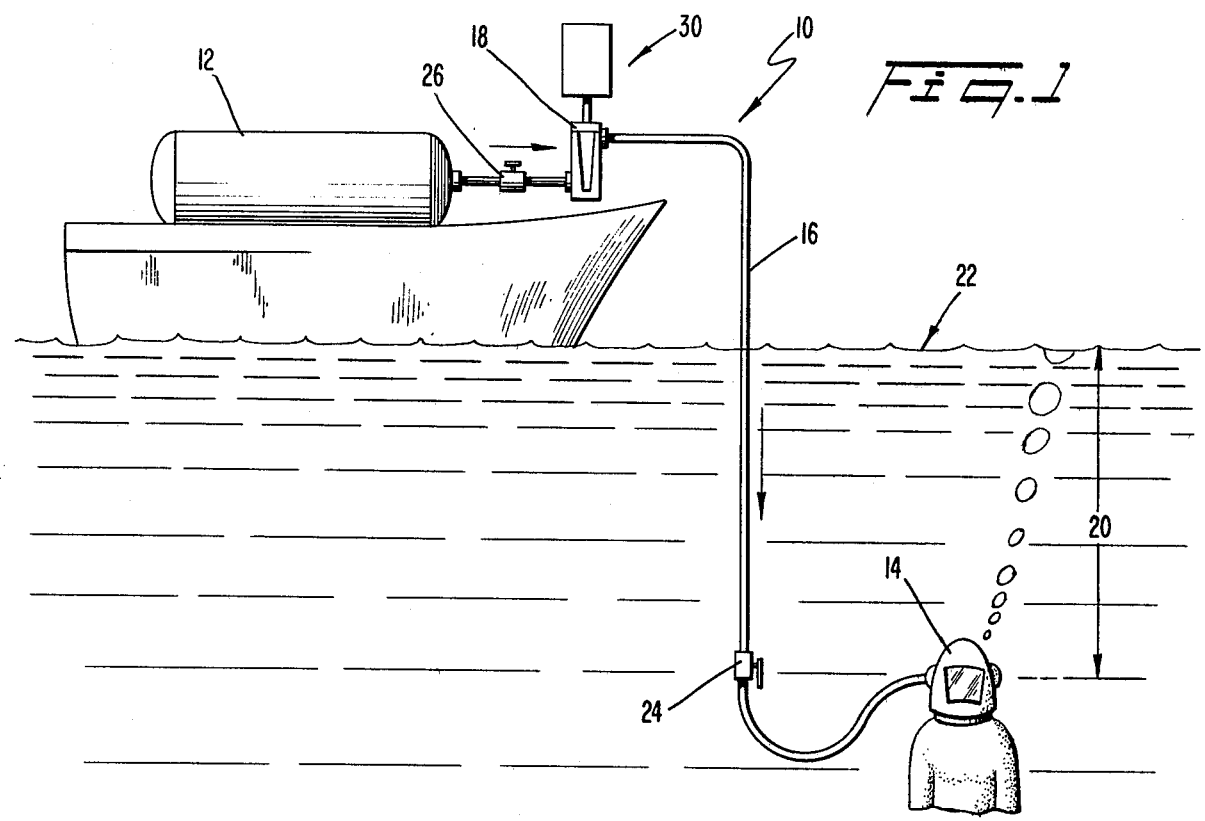
FIG. 1 is a schematic showing application of this invention to a gas supply system for underwater diving.

Reference will now be made in detail to the present preferred embodiment of the invention, an example of which is illustrated in the drawing.

Referring now to FIG. 1, there is shown a gas supply system 10 for supplying breathing gas to an underwater diver. The gas supply system can include a gas source 12, which can be a pressurized container or a compressor, a containment 14 for housing of the diver, a conduit 16 for carrying the breathing gas from source 12 to containment 14, and flow meter 18, shown schematically, for indicating flow rate in conduit 16. The system also includes a regulating valve 24 in conduit 16 at a location close to containment 14. The presence of valve 14 causes conditions, especially the pressure seen by the diver in containment 14, to vary from the gas conditions existing at meter 18. A shut off valve 26 may be included in system 10 between source 12 and meter 18.

As was discussed previously, this invention is ideally suited for the present application in that the delivery conditions for diver containment 14 change radically with the working depth, that is, the distance 20 between the water surface 22 and the position of containment 14. Although the present invention is shown in terms of an embodiment particularly well adapted for use in an underwater diving application, it is not intended that the scope of the invention be restricted to this use.

Still referring to FIG. 1, the gas supply system 10 further includes apparatus 30, shown schematically, for correcting the indication on flow rate meter 18 to provide a corrected indication of the volumetric flow rate delivered to diver containment 14. In the present embodiment, flow rate meter 18 can be a variable-area flow meter, such as a Ar-Met Series 36-30, manufactured by Brooks Instrument Division, Emerson Electric Co. Flow rate indication is typically provided in such meters by means of a graduated scale (not shown) with an indicator such as indicator 19 shown in FIG. 2 with the indicated flow rate on the scale being directly proportional to the movement of the indicator from a zero rate reference mark. The meter indication is accurate only for those specific conditions of the fluid medium (eg. temperature, pressure, specific gravity, viscosity, etc.) for which the meter scale is calibrated. Deviation of any of these specific conditions at the point of measurement from the meter calibration conditions will introduce a calculable error factor into the meter indication.

Figure 2:
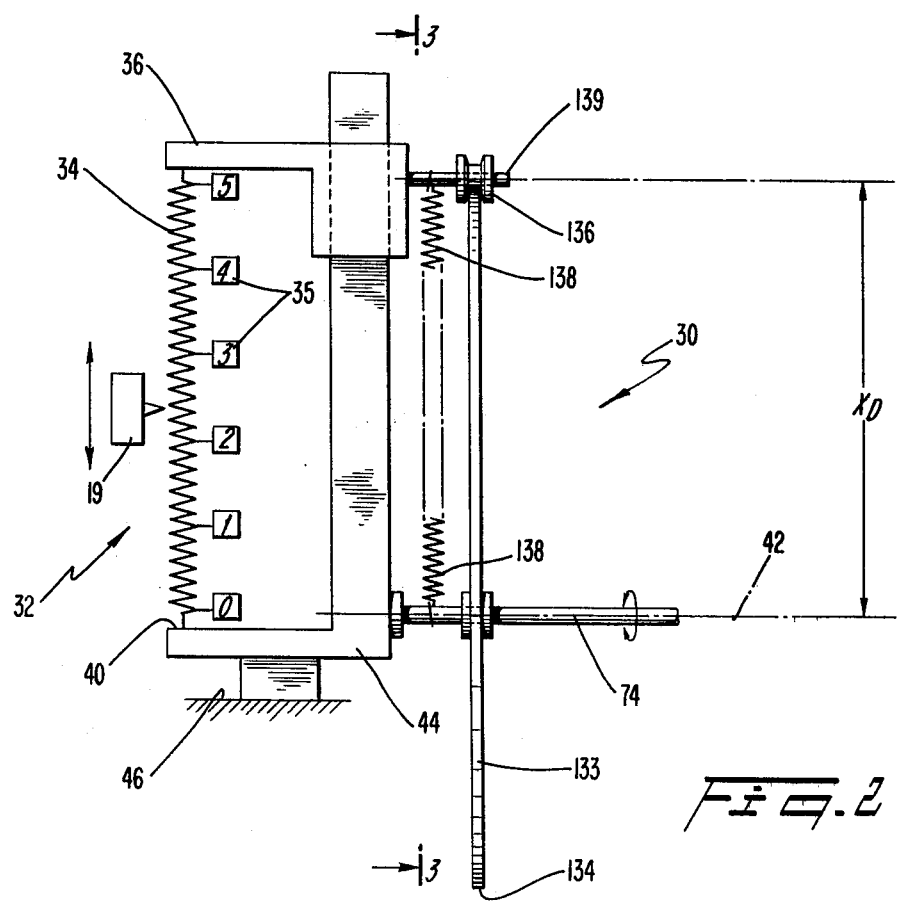
FIG. 2 shows a portion of the embodiment of the invention illustrated schematically in FIG. 1.

In accordance with the invention, and as best seen in FIG. 2, apparatus 30 includes an adjustable scale means such as variable length scale assembly 32 for indicating actual corrected flow rate under varying fluid conditions at the point of measurement and/or at the point of delivery corresponding to the position of diver containment 14. As herein embodied, scale assembly 32 includes an elastic or variable length, graduated scale member 34 positioned such that variable length scale 34 serves as the flow indicating scale of meter 18 and that indicator 19 also serves as the indicator for scale 34 which has graduations 35. Preferably, the variable scale assembly 32 also includes a slide member 36, and means for guiding slide member 36 in translating motion. Variable length scale member 34 has a zero flow reference mark 40 fixed at the zero flow reference mark of motor 18. The opposite end of scale member 34 is fixedly attached to slide member 36. In the present embodiment, slide member 36 is guided by a slide guide 44 fixedly attached to conventional frame 46 of flowmeter 18. Slide guide 44 is oriented such that slide member 36 will control the length of graduated scale member 34.

One type of a variable length scale usable in the present invention with certain modifications is the Model TP007100B marketed by the Gerber Scientific Instruments, Co. In the Gerber device the scale consists of a spring whose appropriately marked loops serve as the scale graduations. The nature of the spring insures that a scalar relationship is maintained among the displacements of the spring loops (scale graduations) as the length of the spring is varied over a given range. Ideally, other elastic materials with appropriate scale graduation marks could serve the same function as the variable length coiled spring shown in FIG. 2.

In addition, it may be noted that variable length scale member 34 may be made to function in applications requiring circular arc scales by incorporating suitable guide means (not shown) to fix scale member 34 in an arc. It is also noted that an adjustable scale with a function similar to that shown in FIG. 2 may also be achieved by other mechanical means such as a controlled tilting of a fixed length scale relative to a pointer that travels in a fixed direction (not shown) or a translatory movement of a fixed length scale relative to a rotating pointer (also not shown).

Figure 4:
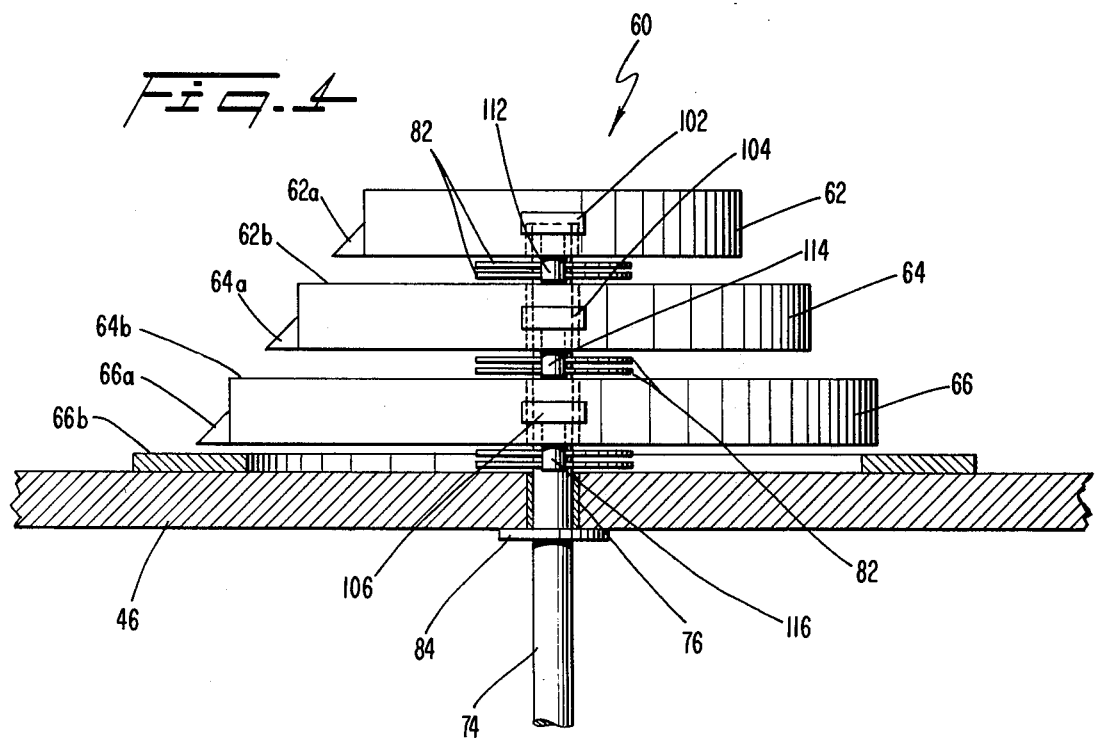
FIG. 4 shows another portion of the flow meter correction apparatus schematically illustrated in FIG. 1.

In accordance with the invention, and with reference to FIGS. 4 and 6, there is provided a means 60 for mechanically calculating a correction factor which may be a function of several variables. Mechanical calculating means 60 is responsive to inputted values of a plurality of fluid properties and conditions affecting meter indication, which properties and conditions are representative of the ambient meter conditions and/or actual delivery conditions corresponding to the position of diver containment 14.

Two sources generally contribute to the correction factor. The first and most common source arises when the properties and/or conditions of the metered fluid are different from the properties and/or conditions of the fluid which was used to calibrate the meter. This error factor is an inherent property of the meter and can be calculated for a given type of meter. The second source which may be of interest arises when the fluid conditions change from the point at which the flow rate is measured (ie. the location of flowmeter 18) to the point of delivery (eg. the position of diver containment 14). If the flow rate at the point of delivery is to be known in units appropriate to the delivery function, it may be then necessary to further adjust the flowmeter indication. The following discussion should better illustrate these points.

In a variable area flowmeter such as meter 18, an indicator float such as indicator 19, is displaced a distance X from a zero flow reference point when a gas of absolute temperature $T_s$, absolute pressure $P_s$, and specific gravity $SG_s$ passes through the meter at a volumetric flow rate of $Q_s$ actual cubic feet per minute. The flow rate scale for a specific meter, (i.e. $Q_s$ as a function of X), is determined, therefore, for a given or standard set of $T_s$, $P_s$, and $SG_s$. Now, consider a gas of absolute temperature $T_m$, absolute pressure $P_m$, and specific gravity $SG_m$ passing through the same meter at a volumetric flow rate of $Q_m$ actual cubic feet per minute. The following equation relates the actual flow rates under the standard and under the nonstandard conditions which result in a given float indication deflection X:

$$Q_m(X) = Q_s(X) \left\{ \left[ \frac{P_s}{P_m} \cdot \frac{T_m}{T_s} \cdot \frac{SG_s}{SG_m} \right]^{\frac{1}{2}} \right\} \qquad 1$$

the {} term in equation 1 constitutes the meter correction factor by which corrected flow rate readings $Q_m$ may be obtained from the meter indicator $Q_s$ on the standard scale of meter 18.

In the case in which the measured gas flowing at a corrected rate $Q_m$ is delivered to diver containment 14 at an absolute temperature $T_d$ and absolute pressure $P_d$ which may be different from $T_m$ and $P_m$ at the meter 18, the Perfect Gas Law states that the volumetric flow rate $Q_d$ actual cubic feet per minute at diver containment 14 is related to $Q_m$ by:

$$Q_d = Q_m(P_m/P_d)(T_d/T_m) \qquad 2)$$

The flow rate $Q_d$ at diver containment 14 may then be related to the indication $Q_s$ on the standard scale of flowmeter 18 by combining equations 1 and 2.

$$Q_d = Q_s \cdot \left\{ \left( \frac{T_d}{P_d} \right) \cdot \left[ \frac{P_s}{T_s} \cdot \frac{P_m}{T_m} \cdot \frac{SG_s}{SG_m} \right]^{\frac{1}{2}} \right\} \qquad 3$$

The present invention employs a variable length of stretchable, graduated scale 34 whose length may be controlled by slide member 36 responsive to mechanically inputted signals from dial means 60. The inputted signals correspond to the variables in scaling equation 3 and are used to compute a correction factor F where:

$$F = \left( \frac{T_d}{P_d} \right) \left[ \frac{P_s}{T_s} \cdot \frac{P_m}{T_m} \cdot \frac{SG_s}{SG_m} \right]^{\frac{1}{2}} \qquad 4$$

In the senario depicted in FIG. 1 pressure $P_d$ and temperature $T_d$ at diver containment 14 and pressure $P_m$ at flowmeter 18 may be variables affecting the accuracy of flowmeter indication $Q_s$. The correction factor F in equation 4 then becomes a function of the three variables, $P_d$, $T_d$, and $P_m$, ie. $F = F(P_d, T_d, P_m)$.

At calibration conditions for meter 18 the flow rate, $Q_s$, is interpreted as a function of the float deflection, X, and a standard scale (not shown) is accordingly marked. At conditions other than standard, it is preferred that a corrected indication $Q_d$ corresponding to the volumetric flow rate $Q_d$ at diver containment 14 be obtained for a float deflection X. One way to accomplish this is to divide the length of the standard scale used to indicate $Q_s(X)$ by a scale factor R so that we have (combining equations 3 and 4):

$$Q_d(X) = Q_s(RX) = Q_s(X) \cdot F \qquad 5$$

In many variable area flowmeters float deflection, X, is proportional to the flow rate $Q_s$ so that:

$$Q_s(X) = BX$$

Using this to solve equation 5 it is found that:

$$R = F \qquad 6$$

The scale factor by which the length of indicator scale $Q_s(X)$ is divided to yield a scale for indicating $Q_d(X)$ in appropriate units corresponding to conditions $P_d$, $T_d$, and $P_m$ is, in this example, equal to the magnitude of meter correction factor F.

In the present invention the length of variable scale 34 may be controlled by mechanical means responsive to inputted mechanical signals representing a number of variable physical parameters such as $P_d$, $T_d$, and $P_m$. The scaling factor R is automatically calculated by mechanical calculating means 60 consisting of stacked dials 62, 64, and 66 in FIGS. 4 and 6 which produce mechanical signals proportional to the logarithm of the respective parameter values, a different one of the parameter variables being characteristically associated with each of the input means, such as dials 62, 64 and 66. Calculating means 60 shown in FIG. 4 is constructed to accommodate three variables, that is, one for each of the dials 62, 64, and 66. Additional (or fewer) dial assemblies could, of course, be provided to accommodate a larger (or smaller) number of variables as necessary.

Each of the individual dial means 62, 64 and 66 includes a pointer, such as 62a, 64a, and 66a and a graduated scale, such as 62b, 64b and 66b, for establishing a dial reference frame. As can best be seen on FIG. 6, the graduations on dials 62b, 64b and 66b are logarithmic and, when the associated pointer dials 62a, 64a and 66a are turned from a reference mark to the graduation corresponding to the value of the associated parameter, the resulting angular displacement of the pointer dial is proportional to the logarithm of the value of the inputted variable.

Calculating means 60 also includes shaft means for mounting dials 62, 64, and 66 onto frame 46. In the present preferred embodiment, as can best be seen in FIG. 4, shaft means includes output shaft 74 which is fixedly attached to uppermost dial 62 and which is free to rotate in panel bushing 76. Lower dials 64 and 66 are free to rotate (except for constraints which will be explained later) about output shaft 74. Output shaft 74 and dial 62 are held in place by collar 84. Collar 84 is positioned so as to insure a snug nontilting fit of the stacked dials 62, 64, and 66 against frame 46. Between abutting dials 62 and 64, 64 and 66, and between dial 66 and frame 46 are located sliding washers 82 (or other suitable antifriction bearings) which, when the restraints described below are released, allow dials 62, 64, and 66 to rotate with respect to each other and with respect to frame 46 without significant friction despite their being forced tightly against one another and against frame 46.

In the present preferred embodiment, means are also provided for coupling and uncoupling individual dials from abutting dials or from frame 46. Referring to FIG. 5, clutching means 120 for coupling and uncoupling adjacent dials 62 and 64 includes foot 112, spring 122, and tapered piston 102. The force of tension spring 122 is transmitted to foot 112 via the wedging action of tapered piston 102. Foot 112 is thereby forced against the surface of lower adjacent dial 64 creating a friction coupling between dials 62 and 64. By forcing piston 102 inward against the force of spring 122 such as by an operator grasping the dial and depressing piston 102 with his finger, the wedging force against foot 112 is released and dials 62 and 64 become free to rotate in relation to each other, but the angular relationships between all other dials remain fixed. Two such clutching assemblies are provided for each dial as shown in FIG. 4. The coupling means shown in FIGS. 4 and 5 is an example and does not limit the type or number of clutching means used.

Under normal conditions, each dial is coupled to its adjacent dial, and the bottom-most dial 66 (refer to FIG. 4, in which the coupling assemblies are shown offset from their proper positions for purposes of illustration) is coupled to fixed frame 46. Thus, none of the dials is normally free to rotate relative to frame 46.

When it is desired to input a new parameter value, the appropriate dial, say 64, for example, is uncoupled from dial 66 by manually grasping dial 64 at the piston button locations 104 (refer to FIG. 4) and pressing inward on these buttons. With the buttons held in, dial 64 is rotated until its pointer 64a indicates the desired new parameter value on associated logarithmic scale 64b. The net angular displacement of dial 64 is then directly transmitted via dial 62, which is coupled to and rotates with dial 64 to output shaft 74. The position of dial 66 remains fixed with respect to frame 46 during rotation of dial 64. Similar operation of the other dials for inputting the other parameter values results in further rotation of output shaft 74 with respect to frame 46. The angular rotation $\theta_{74}$ of the output shaft 74 with respect to frame 46 is thus seen to be equal to the algebraic sum of the following defined angular rotations:

$$\theta_{74} = \theta_{66-46} + \theta_{64-66} + \theta_{62-64};$$

where $\theta_{66-46}$, the angular rotation of dial 66 relative to frame 46;

$\theta_{64-66}$, the angular rotation of dial 64 relative to dial 66; and $\theta_{62-64}$, the angular rotation of dial 62 relative to dial 64.

7

The above described train of dial assemblies acts in a fashion similar to a series of circular slide rule calculators, in that the relative angular displacements of the individual dial assemblies correspond to the logarithms of the respective input variables, where individual relative angular displacements would be combined to produce a new angular displacement proportional to the logarithm of the desired calculated parameter. With reference to equation 4 discussed previously, it can be appreciated that the controlling variable parameters appear as factors in either the numerator or the denominator of the governing flow correction equation. The numerical processes of multiplication and division that would be required to solve the governing flow correction equation are accomplished in the present invention by adding and subtracting the individual relative angular displacements generated by dials 62, 64, 66 and frame 46 corresponding to the logarithmic values of the associated input parameters. Equation 8 is related to meter correction factor F by taking the logarithm of equation 4:

$$\ln F = C + \ln T_d - \ln P_d + \tfrac{1}{2}\ln P_m \qquad 8$$

where $$C = \tfrac{1}{2}\left\{ \ln \frac{P_s \cdot SG_s}{T_s \cdot T_m \cdot SG_m} \right\}$$

is a calibration constant. Let output shaft deflection $\theta_{74}$ correspond to the logarithm of correction factor F and the relative rotation angles $\theta_{64-46}$, $\theta_{64-66}$ and $\theta_{62-64}$ of dials 62, 64, 66 and frame 46 correspond to the logarithms of the respective input variables $P_d$, $T_d$, and $P_m$ such that:

$$\theta_C = C$$

$$\theta_{74} = \ln F \qquad 9$$

$$\theta_{66-46} = \ln T_d \qquad 10$$

$$\theta_{64-66} = -\ln P_d \qquad 11$$

$$\theta_{62-64} = \tfrac{1}{2}\ln P_m \qquad 12$$

The angular displacement associated with $\theta_C$ is accommodated in the placement of dial 66b relative to frame 46.

Angular rotation $\theta$ in a clockwise direction (referring to FIGS. 3 and 6) will be defined as a positive quantity and angular rotation in a counter clockwise direction will be defined as a negative quantity. Input scales 62b, 64b, and 66b are constructed according to respective equations 10, 11, and 12 above to produce angular deflection of output shaft 74 as defined in equation 9. (Scale 64b for input $P_d$ will be oriented in a counter clockwise direction for increasing $P_d$ because of the $-\ln P_d$ function.)

Figure 3:
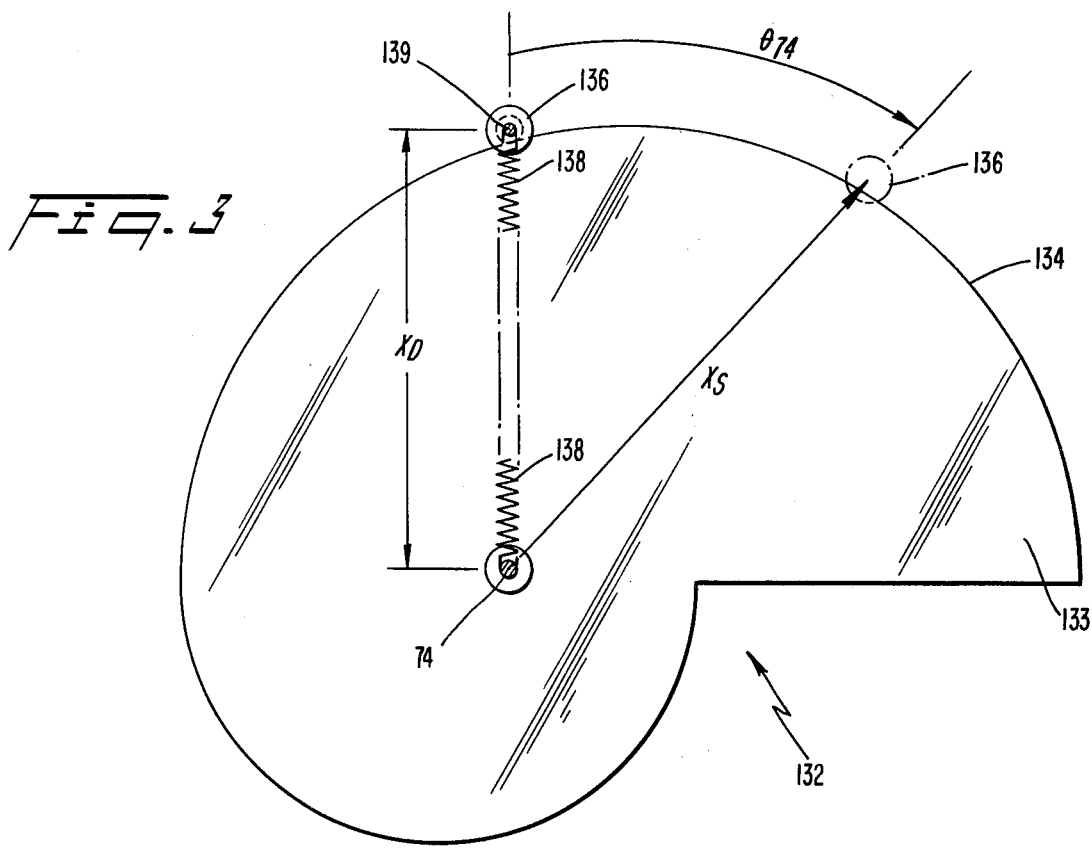
FIG. 3 shows a sectional view of the portion of the invention shown in FIG. 2.

In accordance with the invention, means responsive to the logarithm of the correction factor calculated by calculating means 60 are provided for interrelating the indicator of meter 18 with the variable length scale assembly 32 for indicating a corrected flow rate value $Q_d$. As embodied herein, the interrelating means includes positioning means 132 (FIGS. 2 and 3) for converting the angle of deflection outputted from calculator 60 on shaft 74 into a movement of slide member 36 so as to control the length of variable length scale 34 in accordance with the scaling factor R of equation 6. Referring to FIG. 3, if $X_s$ is the length of the variable length scale 34 at standard conditions, then equation 5 dictates that the length $X_d$ of scale 34 for purposes of indicating flow rate $Q_d$ should be:

$$X_d = X_s/R$$

$X_d = (X_s/F)$ (by equation 6)

$X_d = X_s \cdot e^{-\theta_{74}}$ (by equation 9)      13

As embodied herein, positioning means 132 includes exponential cam 133, cam follower 136, and cam follower shaft 139. Exponential cam 133 is fixed to output shaft 74 and has cam edge 134 as illustrated in FIG. 3. The range of $\theta_{74}$, and hence the travel of cam 133 as determined by equation 13 will be determined by the ranges of the magnitudes of the input parameters $P_d$, $T_d$, and $P_m$ and other design factors.

Output shaft 74 is positioned so that its axis 42 intercepts the fixed zero position of variable length scale 34 (the zero flow reference position of flowmeter 18). Cam follower shaft 139, along with associated cam follower 136, is constrained to track cam edge 134 by the force exerted by tensioning means, such as spring 138, acting between output shaft 74 and cam follower shaft 139. The positioning of cam follower shaft 139 with respect to slide member 36 is such that the distance $X_s \cdot e^{-\theta_{74}}$ from the center of output shaft 74 to the axis of the cam follower shaft 139 is the same as the length $X_d$ of variable length scale 34 required to produce corrected flow indication.

It will be apparent to those skilled in the art that modifications and variations can be made in the apparatus of the present invention without departing from the scope or spirit of the invention. Thus, it is intended that the present invention cover the modifications and variations of this invention provided that they come within the scope of the appended claims and their equivalents.

What is claimed is:

1. Apparatus for correcting to read actual flow the indication on a flow rate meter used in a fluid supply system having actual measurement conditions and/or point of fluid use conditions varying substantially from meter calibration conditions, the flow rate meter having an indicator, the indicated flow rate being uniquely related to the movement of the indicator from a zero flow rate reference mark, the apparatus comprising:
   (a) adjustable scale means for indicating corrected flow rate;
   (b) means for calculating a correction factor relating the meter indicator deflection at actual measurement and point-of-use conditions to the meter indicator deflection at calibration conditions, said calculating means being responsive to inputted values of a plurality of flow rate indication influencing variable parameters representative of the actual measurement and point-of-use conditions;
   (c) positioning means responsive to said calculating means for interrelating said adjustable scale means with the meter indicator, a corrected flow rate being indicated on said adjustable scale means by the meter indicator,
   wherein said adjustable scale means includes a variable length scale means having a continuously stretchable member, wherein the effective length of said stretchable member is controllable relative to the effective travel range of the meter indicator and wherein said interrelating means includes positioning means cooperating with said variable length scale means for converting said calculated correction factor into a proportional change in the effective length of said stretchable member relative to the effective travel range of the meter indicator.

2. The apparatus as in claim 1 wherein said stretchable member is graduated and has a zero flow reference mark aligned with the meter zero flow reference mark, the meter indicator registering on said changed length graduated stretchable member at the correct flow rate value.

3. The apparatus as in claim 1 wherein said calculating means is mechanical and includes:
   (a) means for inputting values of said parameters corresponding to the actual meter conditions and actual point-of-use conditions, said inputting means producing mechanical signals proportional to the logarithms of the respective inputted values;
   (b) means for combining the individual ones of said mechanical signals generated by said input means to produce a first net mechanical signal proportional to the logarithm of said correction factor, the individual ones of said mechanical signals being added when an increase in the respective parameter value tends to cause a decrease in meter indicator movement per unit flow rate, and being substracted when an increase in the respective parameter value tends to cause an increase in meter indicator movement per unit flow rate according to the governing flow rate indication equation for the meter.

4. The apparatus as in claim 3 wherein said input means includes shaft means and a plurality of dial means rotatably mounted on said shaft means, and wherein said mechanical signals are in the form of angular displacements of the individual dial means.

5. The apparatus as in claim 4 wherein each of said dial means includes a graduated dial for establishing a dial reference frame and an associated pointer dial for aligning with the value on said reference frame corresponding to the respective parameter value, and wherein each of said dial means includes clutch means for manually uncoupling individual ones of said graduated dials from said associated pointer dials for enabling relative angular movement therebetween when inputting the respective parameter value, said graduated dials being normally coupled to said associated pointer dials.

6. The apparatus as in claim 5 wherein the individual ones of said dial means are arranged sequentially, and wherein said combining means include means for engaging each of said dial means with the next-in-sequence one of said dial means, the angular movements of each of said dial means being transmitted to the next-in-sequence one of said sequenced dial means and being propagated along said sequence toward said shaft means.

7. The apparatus of claim 1 wherein said calculating means outputs said calculated correction factor in logarithmic form and said positioning means also includes means for generating the antilogarithm of said logarithmic factor.

8. The apparatus as in claim 7 wherein said calculating means includes an output shaft and said logarthimic correction factor is in the form of an angular displacement of said output shaft, and wherein said positioning means includes a cam means attached to said output shaft for moving said adjustable scale means, said cam means having an exponential camming surface for producing an adjustable scale means displacement corresponding to the antilog of said logarithmic correction factor.

9. Apparatus for indicating in appropriate units the actual flow rate of a breathing gas to a diver working below the surface of a body of water, said diver being housed in a containment which is at a pressure equal or near to the ambient water pressure outside the containment, the containment being supplied via a conduit with breathing gas at a substantially higher pressure from a gas source located above the surface of the body of water, and the containment further including a flow rate controlling element located in close proximity to the diver, the apparatus comprising:

(a) flow rate meter means associated with said conduit and positioned above the surface of the body of water, said meter means for providing a mechanical movement of a flow rate indicator which is uniquely related to the flow rate through said conduit;

(b) means cooperating with said meter means for correcting the flow rate indication of said meter means to reflect the actual flow rate at the ambient conditions in the diver containment, wherein said meter means includes a meter scale having zero flow reference mark and a meter indicator, said indicated flow on said meter scale being uniquely related to the movement of said indicator from said reference mark, and wherein said correcting means includes:

(i) adjustable scale means for indicating actual flow rate at containment conditions;

(ii) means for mechanically calculating a correction factor relating the movement of the meter indicator with said adjustable scale means, said calculating means being responsive to inputted values of a plurality of flow rate indication influencing parameters representative of containment conditions and meter conditions;

(iii) means responsive to the correction factor calculated by said calculating means for interrelating the meter indicator with said adjustable scale means, wherein said adjustable scale means includes a variable length scale means having a graduated, continuously stretchable member for indicating corrected flow rate, and wherein said interrelating means includes means for adjusting the length of said stretchable member.

* * * * *